United States Patent
Stepan

(10) Patent No.: US 6,321,621 B1
(45) Date of Patent: Nov. 27, 2001

(54) DEVICE FOR REMOVING LAYERS FROM A WAVEGUIDE

(75) Inventor: Jiri Stepan, Sargans (CH)

(73) Assignee: Schleuniger Holding AG (CH)

( * ) Notice: Subject to any disclaimer, the term of this patent is extended or adjusted under 35 U.S.C. 154(b) by 0 days.

(21) Appl. No.: 09/355,054

(22) PCT Filed: Jan. 26, 1998

(86) PCT No.: PCT/EP98/00406

§ 371 Date: Oct. 12, 1999

§ 102(e) Date: Oct. 12, 1999

(87) PCT Pub. No.: WO98/33082

PCT Pub. Date: Jul. 30, 1998

(30) Foreign Application Priority Data

Jan. 24, 1997 (CH) .................................... 150/97

(51) Int. Cl.[7] .................................... H02G 1/12
(52) U.S. Cl. .................................... 81/9.51; 81/9.42
(58) Field of Search .................................... 81/9.4–9.44, 9.51

(56) References Cited

U.S. PATENT DOCUMENTS

| | | | |
|---|---|---|---|
| 3,182,532 | * 5/1965 | Oehlerking | 81/9.41 |
| 4,584,912 | * 4/1986 | Gudmestad et al. | 81/9.51 |
| 4,601,093 | 7/1986 | Cope | 29/564.4 |
| 4,619,164 | 10/1986 | Aikens | 83/200 |
| 4,745,828 | 5/1988 | Stepan | 81/9.51 |
| 5,016,500 | * 5/1991 | Conrad et al. | 81/9.4 |
| 5,320,002 | * 6/1994 | Sayyadi et al. | 81/9.51 |
| 5,351,580 | * 10/1994 | Potesta et al. | 81/9.44 |
| 5,398,573 | * 3/1995 | Wollermann | 81/9.51 |
| 5,582,078 | * 12/1996 | Talley | 81/9.51 |
| 5,669,276 | * 9/1997 | Spacek | 81/128 |
| 5,787,768 | * 8/1998 | Talley | 81/9.51 |

FOREIGN PATENT DOCUMENTS

WO 89/02796   6/1989 (WO) .................................... B21F/13/00

OTHER PUBLICATIONS

Patent Apstracts of Japan. 04257802 dated Sep. 14, 1992.
"Hot jacket Stripper HJS–01 Instruction Manual". Fujikura PS–02 Primary Caot Stripper cover page. JP–A–1/147503 Drawing. Northern Telecom—NT7L30GA Automated Stripper Cleaver Pamphlet. 2 Pages.
Ideal Rotary Wire Strippers Pamphlet. 4 Pages.

* cited by examiner

Primary Examiner—Joseph J. Hail, III
Assistant Examiner—David B. Thomas

(57) ABSTRACT

The invention relates to a compact device in which a plurality of functions of the stripping process are automatically performed by a single drive (29) and coupled mechanisms. The main body (1) comprises a frame which supports connecting rods (28) at the front ends (27) of which is fastened a support element (10) for the change operations which is equipped either with a clamping head (3) or with an adapter (12) and serves for receiving an optical waveguide. Pivotable heating jaws (4) having control handles (51) are shown as well as stripping knife jaws (5) and a collar for adjusting the clamping force of the clamping jaws (36) which are held in the closed position by spring force and can be opened by a release lever (6) having a right-left coarse thread on a shaft (47) of the lever (6) for the introduction of an optical waveguide.

37 Claims, 4 Drawing Sheets

DEVICE FOR REMOVING LAYERS FROM A WAVEGUIDE

The invention relates to a device according to the preamble of claim 1, having an arrangement of electromechanical parts for removing one or more protective layers from a single-conductor or multiconductor optical waveguide. A device corresponding to the preamble was brought onto the market by the Applicant under the name FO 45 or by the name Handcoax.

Further devices have been disclosed for stripping exclusively optical waveguides, for example under the name HJS-01 by a Japanese company. However, in contrast to the stated devices of the Applicant, this device has no electric drive controlling the stripping.

An externally similar device is described in DE-A-4203995. In this design, a special material for stripping knives is protected. The force with which the stripping knives are pressed against the optical waveguide, maintenance of the heating time and in particular the stripping speed are left to the operator. This gives rise to considerable differences in the quality and time losses through the operation.

A particular problem is the impossibility of maintaining optimum stripping procedures. Thus, in manual stripping, relatively great resistance to stripping is detectable as a rule after incision into the material and at the beginning of the stripping, which resistance causes the operator to apply a relatively large stripping force. After the beginning of the stripping movement, however, the resistance to stripping decreases rapidly so that the high force applied by the operator leads to a sudden, abrupt stripping movement.

This can cause axial overloading of the optical fibers and of the conductor.

In the device according to DE-A or in the process used therewith and comprising of "soft" stripping knives, as well as another process, it is usual to heat the sheath. However, to enable the soft knives to make a good incision, heating must also be effected in the region of the knives in this known device. However, this may be disadvantageous because a soft sheath offers less supportive resistance for centering functions. A slightly harder sheath in the region of the interface is desirable since, according to the invention, it provides a covering for the remaining heated protective layer. Consequently, the invention should also permit in particular the use of hard, metallic stripping knives, so that the interface itself need not be heated.

CH-A-683645 describes a semiautomatic device for stripping optical waveguides. However, this device has a plurality of individual drives separate for each function, which is disadvantageous with regard to the size and required control volume. A version of this device in the form of a hand device is therefore possible only with difficulty.

The object of the invention is thus furthermore to achieve a device which has a small volume and low production costs and at least a semiautomatically controlled function sequence, in order to achieve good stripping quality and uniform sheath or layer removal therewith, as in the case of conventional larger, fully automatic devices.

The size and the required control volume should be so small that a device according to the invention should be capable of being held in the hand, in a manner comparable with the existing non-motor-driven devices.

The prior art includes further documents which describe devices which do not perform these functions: DE-A-3736581; DE-A-4007762; DE-A-4038414; DE-A-3529141; JP-A-1-147503; JP-A-4-257802; JP-A-3-61908; JP-A-62-25703 and U.S. Pat. No. 5033335.

The combination of the features of claim 1 achieves the main object of an after [sic] size reduction and nevertheless uniform stripping quality. Improved solutions having further integration and further advantages over the prior art are evident from the dependent claims. The dependent claims 5 to 18 relate to devices which can also be used independently and advantageously in other stripping devices. Further improvements and details according to the invention are evident from the drawing, which shows an embodiment according to the invention.

Figure 1:
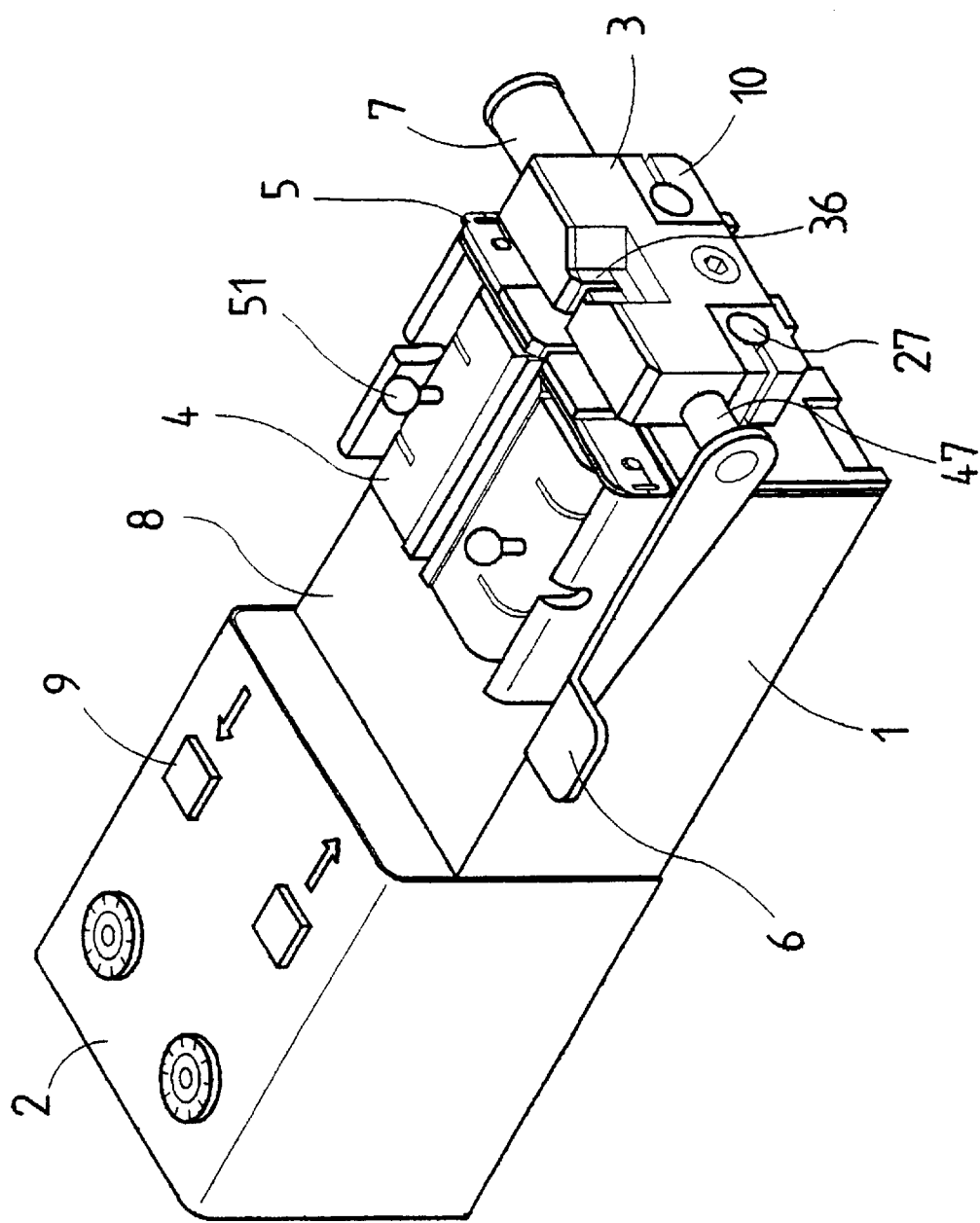
FIG. 1 shows a view of a complete stripping device according to the invention, having a closed housing.

FIG. 1 shows a main body 1. This carries, in its rear part, a control housing 2 in which the control electronics and at least one actuation element 9 are located. The main body 1 comprises a frame which supports connecting rods 28, at the front ends 27 of which a support element 10 for the change operations is fastened, which support element is equipped either with a gripping head 3 or with an adapter 12 (FIG. 2) and serves for holding an optical waveguide. Pivotable heating jaws 4 having control handles 51 are shown, as well as stripping knife jaws 5 and a collar for adjusting the clamping force of the clamping jaws 36 which are held by spring force in closed position and can be opened by means of a release lever 6 having a coarse right-left thread on a shaft 47 of the lever 6 for insertion of an optical waveguide.

Figure 2:
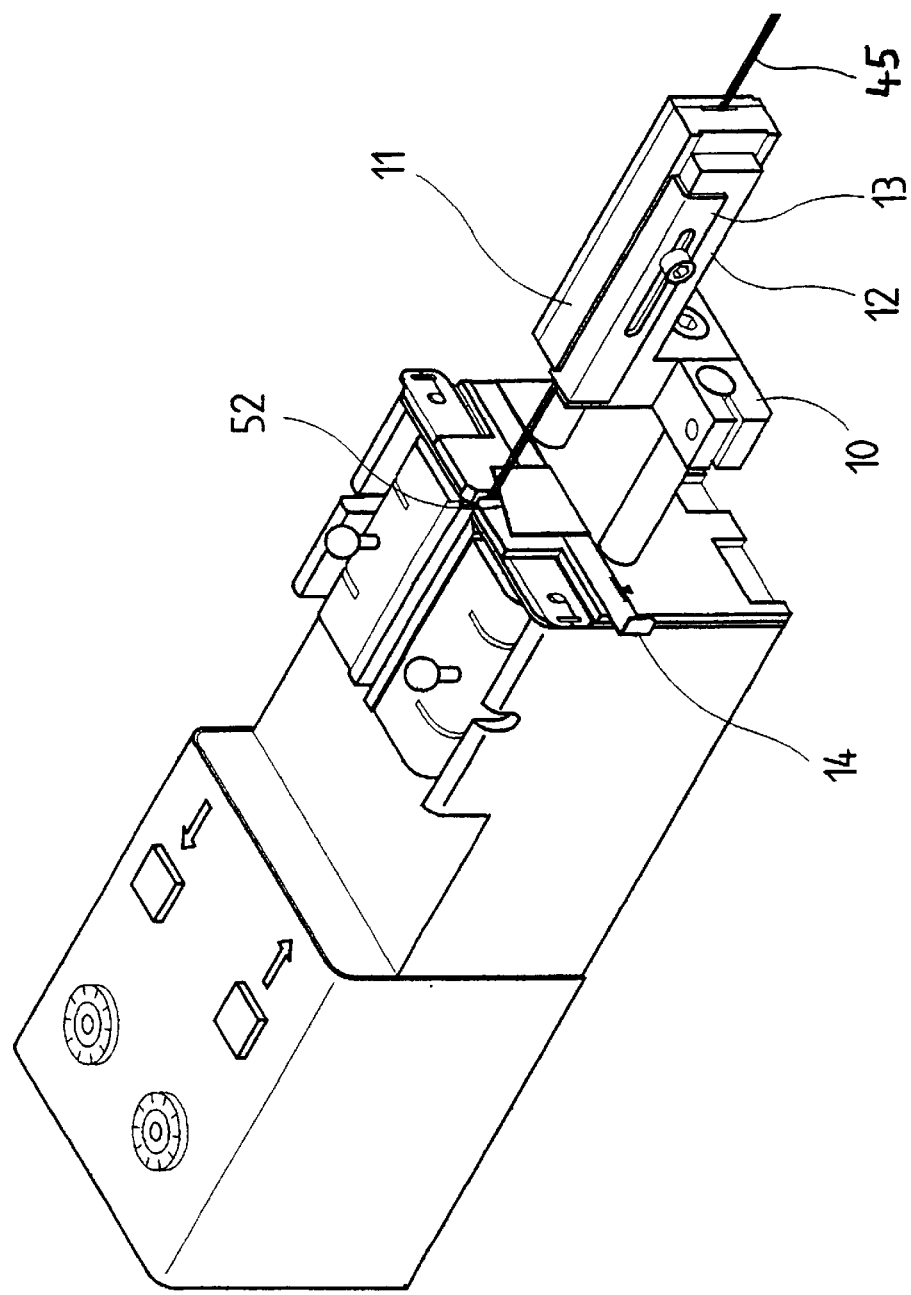
FIG. 2 shows a view of the same stripping device with an adapter for an assembly holder for special optical waveguides.

FIG. 2 shows the same structure but, in place of the clamping head, the adapter 12 which carries an assembly holder 11 in which a multiconductor fiberoptic cable 45 is placed. As a rule, assembly holders 11 which remain on the optical waveguide during the entire processing are used for stripping and subsequent splicing. A position stop 13 determines the relative axial position of the assembly holder 11 on the adapter 12.

Figure 3:
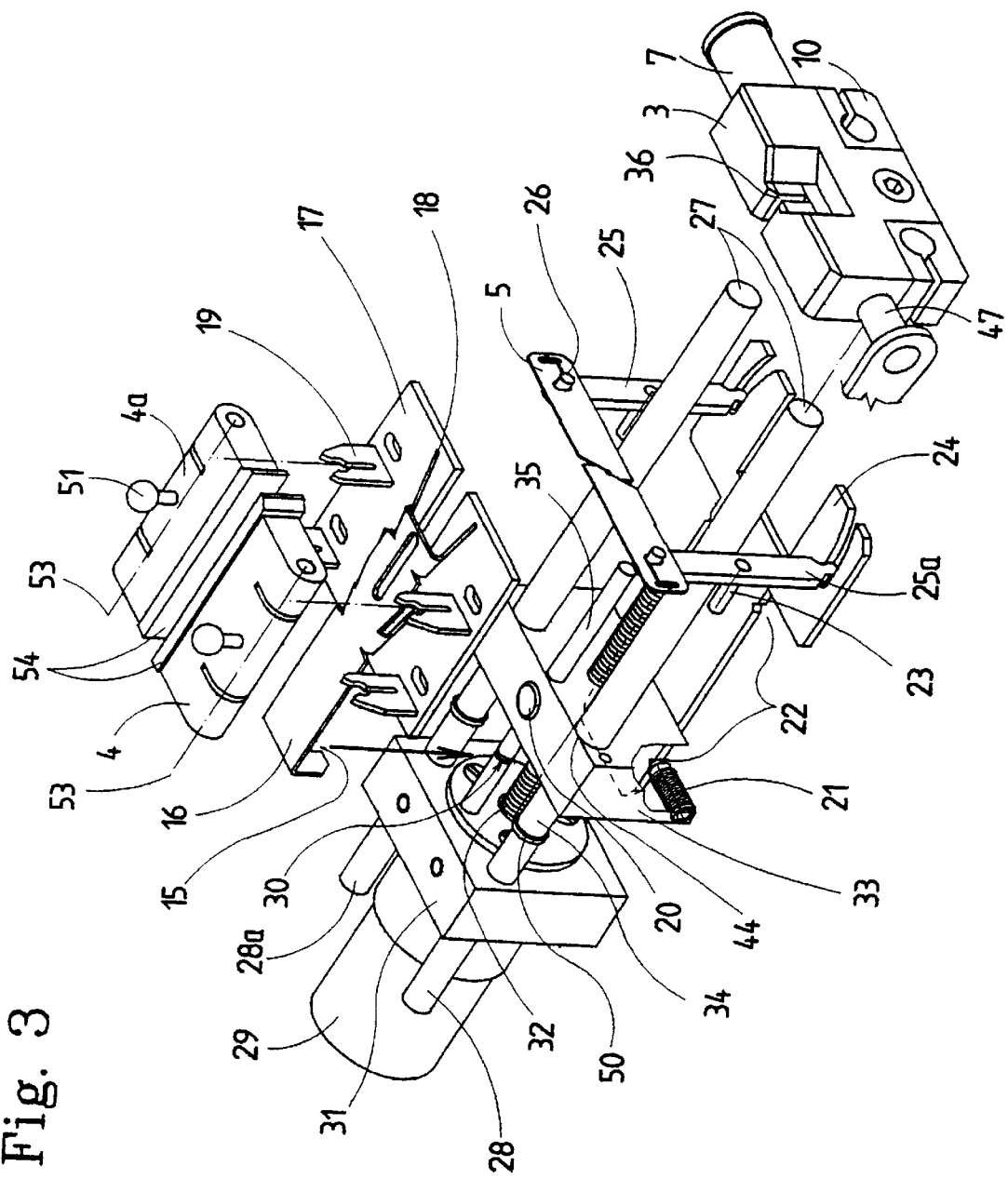
FIG. 3 shows an isometric view of the mechanical system of the stripping device according to FIG. 1.

FIG. 3 shows an example of an internal structure, of an embodiment according to the invention, having a motor support 31, connectable to the main body, and an electric drive 29 which is fastened on said motor support and is optionally in the form of a gear motor. This drives a threaded spindle 32 which drives a displacement element 33. The displacement element 33 slides in the region of spaces 34 on connecting rods 28. The spaces 34 are bounded by stop rings 50 and shoulders 44. Shoulders 44 and stop rings 50 could also be interchanged. The rings serve as shoulders but can be removed for assembly purposes. As soon as the displacement element 33 rests against the shoulders 34 or rings 50, it carries the connecting rods 28 with it when it moves forward or backward. A further connecting rod 35 which is lightly braked in the axial direction by a brake pad 20 and thus carried along is displaceably positioned in the upper region of the displacement element 33. A notch or groove 30 in the further connecting rod 35 transmits this axial movement to a fork 15 of a link 16. The link 16 engages, by means of positive elements, oblique grooves 18 in a link 17 which is preferably in the form of a circuit board. These circuit boards each carry two heating jaw forks 19 for fastening the heating jaws 4. The heating jaw forks 19 are electrically conducting and provide an appropriate power supply for the heating elements of the heating jaws 4. Positioned in the lower region of the displacement element 33 are two springy pressure pins or ball catches 21. These transmit the axial movement of the displacement element 33 to a link 24 in the form of a control fork by snapping into lock grooves 22 on the link 24. Swivel levers 25 which are pivotable about bearing pins 23 in the frame are controlled by the link 24. Levers 25 transmit, via straight pins 26, the swivel movement for closing or opening the knives 5 and centering jaws 5z (FIG. 4.).

Figure 4:
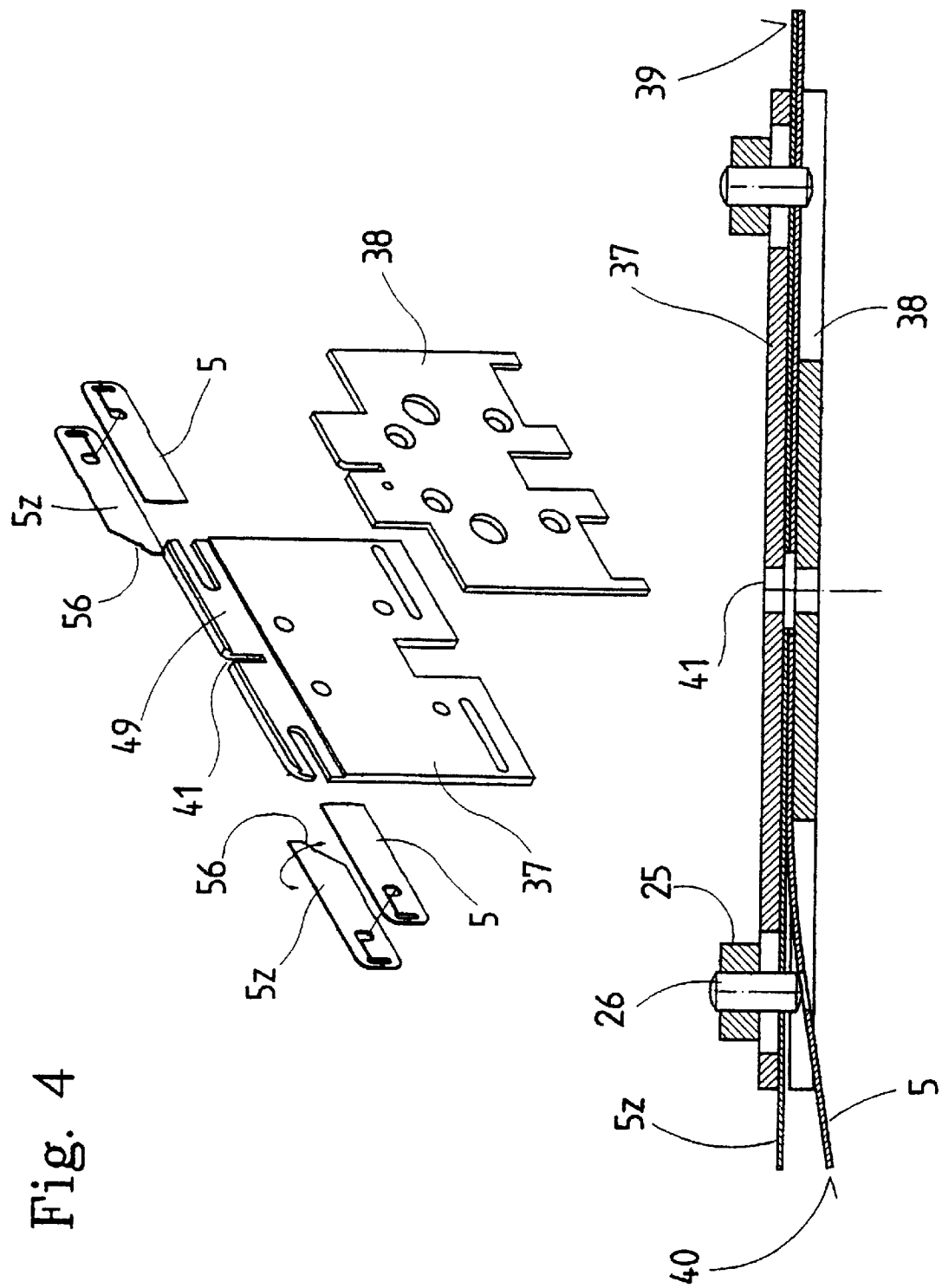
FIG. 4 shows a detail of the guide of the stripping knives and centering jaws.

FIG. 4 shows a precise guidance of the knives 5 and centering jaws 5z and the simple replaceability thereof by slight bending 40 and locking or releasing on the straight pins 26 without tools being required for this purpose.

The operation of the embodiment shown is explained below:

In the starting or rest position, the displacement element 33 (FIG. 3) is at the far left and hence the connecting rods 28 and the clamping head 3, too, are in the retracted and adjacent rest position. As a result of the likewise retracted left position of the control link 24 and of the further connecting rod 35, the knives 5 and centering jaws 5z are opened by means of the levers 25 by swivelling about its axes 23 of rotation which are fixed relative to the frame, and the heating jaws 4 are opened by means of the links 16 and 24.

In this position, the optical waveguide section intended for processing is placed between the clamping jaws 36 opened by the release lever 6. After the release of the lever 6, the clamping jaws, clamped by torsional spring force (adjustable by means of collar 7 for adjusting the clamping force), are held between the clamping jaws 36 [sic].

After the start button has been pressed, the drive 29 moves the displacement element 33 to the right by turning the threaded spindle 31. Owing to the light braking effect between further connecting rod 35 and brake pad 20, this too and hence, via the fork 15, the link 16 are moved to the right. By means of oblique grooves 18 in which the projecting positive elements of the link 16 engage, the links or circuit boards 17 and hence the heating jaw forks 19 and finally the heating jaws 4 are moved together against the conductor to be processed.

By means of the ball catches 21 snapped into the grooves 22, the link 24, too, is moved to the right and hence the knives 5 and centering jaws 5z are pushed against the conductor.

After this displacement, the electronic control stops the drive 29 before the displacement element 33 has reached the shoulders 44 of the connecting rods 28. The control now waits for the expiry of the set heating time of the heating jaws 4. After this time, the drive moves the displacement element 33 further to the right by turning the threaded spindle 32. Preferably at reduced speed, which corresponds to the desired stripping speed. During this displacement, the further connecting rod 33 slips through the brake pad 20 since the heating jaws 4 cannot be closed further. The resulting frictional force is proportional to the pressure of the heating jaws 4 on the conductor. By adjusting the pressure of the brake pad 20 on the further connecting rod 35, it is thus possible to set the pressure of the heating jaws 4. The link 24, too, can no longer be pushed further to the right since it has no further space for the lever 25. The ball catches therefore snap out of the left lock grooves 22 and slide forward along the lateral edge of the link 24 until they snap into the front lock grooves 22. After the desired complete stripping of the sheath to be stripped, the electronic control switches the direction of rotation of the motor, and the displacement element 33 moves back in the region of the space 34 without transporting the connecting rods 28. As a result of the frictional effect of the brake pad 20, this has the result that the further connecting rod is pushed back and the heating jaws 4 are thus opened. Owing to the locking of the ball catches 21 in the lock grooves 22, the link 24 is also drawn back and consequently the lever 25 is swivelled in the opening direction and the knives 5 and centering jaws 5z are opened. Before the displacement element 33 comes up against the stop ring 50 of the connecting rods 28, the electronic system stops the drive. Only after removal of the stripped conductor does the drive travel back with the displacement element and the connecting rods 28 and with the clamping head 3, preferably at a higher speed, to the original left rest position. This can be brought about by pressing a "Return" button or takes place with a certain time delay. Switch buttons which perform both functions simultaneously are also possible.

The variety of conductors to be processed demands a possibility for rapidly changing the stripping knives 5 and the centering jaws 5z. This problem is advantageously solved, according to FIG. 4, by providing a fixed guide plate 37 having a highly accurate guide groove 49 which is covered by a cover plate 38 and thus forms a precise guide for knives 5 and centering jaws 5z. Spring properties of the knives 5 and centering jaws 5z enable the jaws to snap in and snap out by a simple spring action 40.

In addition to the device for processing optical waveguides, the invention also relates to a device of this type for cables of the conventional sense or can be advantageously also used for conventional cables.

LIST OF REFERENCE SYMBOLS

1 Main body
2 Control housing
3 Clamping head
4 Heating jaws
5 Knives
5z Centering jaws
6 Release lever
7 Collar for adjusting the clamping force
8 Waste space
9 Control elements
10 Support element for the change operations
11 Assembly holder, special holder
12 Adapter
13 Positioning stop
14 Auxiliary stop
15 Fork
16 Second link control
17 Circuit board, electronic control
18 Oblique groove
19 Heating jaws, control fork
20 Brake pad
21 Ball catches, springy pressure pins
22 Lock grooves
23 Axis of rotation
24 First control link
25 Lever
26 Straight pin
27 Connecting rod end
28 Connecting rods
29 Electric drive motor, gear motor
30 Notch
31 Motor support
32 Threaded spindle
33 Displacement element
34 Space, driving
35 Further connecting rod 36 Clamping jaws
37 Guide plate
38 Cover plate
39 Inserted position, centering and knife jaws
40 Spring action of centering and knife jaws during change
41 Gap for optical waveguide
42 Optical waveguide
43
44 first shoulder
45 multiconductor optical waveguide
46 sheath
47 support shoulder
48 knife blade
49 guide groove
50 stop ring, e.g. securing ring
51 handle
52 stop surface
53 axle
54 heating surface
55 optical waveguide end
56 centering surface

What is claimed is:

1. Device for removing at least one layer from a single-conductor or multiconductor optical waveguide (45), having
   a displacement element (33),
   at least one powered stripping drive (29, 32), having an axis, which stripping drive provides axial feed movement of the displacement element (33),
   a clamping device (3) displaceable in the axial direction of the stripping drive (29, 32), and
   at least one stripping knife (5) that closes and opens about the optical waveguide (45), wherein
   the stripping drive (29, 32) makes a frictional connection with a first mechanism (21–26) that utilizes at least a portion of the axial feed movement of the stripping drive for closing and opening the stripping knife (5).

2. Device as claimed in claim 1, having a heater (4), wherein the stripping drive (29) is connected to a second mechanism (35, 30, 15–19) that utilizes another portion of the axial feed movement of the stripping drive for applying and removing the heater (4) against and away from the optical waveguide (45).

3. Device for removing a layer of an optical waveguide (45) having
   a control element (33),
   at least one stripping knife (5) that closes and opens about the optical waveguide (45),
   a longitudinally displaceable clamping device (3) optical waveguide (45), and
   a linear drive (29, 32) that provides linear feed movement of the control element (33) for radially applying and removing the at least one stripping knife (5) against and away from the optical waveguide (45), wherein
   the control element (33) includes a drive device that drives the clamping device (3) as a function of the position of the control element (33).

4. Device for removing a layer, having
   a clamping device (3; 11–13) for an optical waveguide (45), which clamping device is axially displaceable relative to the optical waveguide (45),
   stripping knives (5) having a closing and opening movement, which knives are applied radially to the optical waveguide (45),
   a first coupling that enables separate actuation or displacement of the stripping knives (5) and the clamping device (3; 11–13), and
   an electric powered drive (29) having an axis, which electric powered drive drives a first mechanism (32, 33, 24–26) for closing and opening movement of the stripping knives (5), wherein
   the electric powered drive is connected by a second mechanism (33, 28) to provide an axial feed of the clamping device (3; 11–13), and
   the stripping knives are provided between the clamping device (3) and the electric powered drive (29).

5. Device as claimed in claim 4, wherein a second coupling (34, 44, 50) is provided between the clamping device (3; 11–13) and a second mechanism (32, 33, 28), to enable a forward movement and a backward movement of the clamping device (3; 11–13) independently of the closing and opening movement of the stripping knives (5).

6. Device as claimed in claim 1, having heating jaws (4) for optical waveguides or layers on optical waveguide sheaths wherein the jaws (4) are applied radially to the optical waveguide under motor control.

7. Device as claimed in claim 6, wherein the jaws (4) are connected to the drive (29) via a third mechanism (33, 35, 20, 16, 17), the third mechanism (33, 35, 20, 16, 17) comprising a third coupling.

8. Device as claimed in claim 6, wherein at least one jaw (4) is pivotable about an axis (53) parallel to the optical waveguide axis.

9. Device as claimed in claim 5, wherein the first and second couplings comprise at least one of the following elements:
   a driving space (34) along a connecting rod (28);
   a ball catch (21) with diametrically opposite lock grooves (22) in a control link (24);
   a friction clutch (35, 20).

10. Device as claimed in claim 2, wherein the first and second mechanisms have at least one of the following elements:
    an axially displaceable connecting rod (28) having a spindle-driven displacement element (33),
    a first control link (24) that is displaceable parallel to the axis of the optical waveguide and is alternately driven by the displacement element (33), and
    a second link control (16, 17) that is displaceable parallel to the axis of the optical waveguide.

11. Device as claimed in claim 1, wherein the clamping device (3) comprises a clamping mechanism that is opened by a release lever (6), the initial tension of the clamping force of the clamping jaws (36) being adjustable.

12. Device as claimed in claim 1, wherein centering jaws ($5_z$) directly adjacent to the stripping knives (5) are positioned at the side of the stripping knives, the stripping knives (5).

13. Device as claimed in claim 1, wherein the stripping knives (5) and centering jaws ($5_z$) are guided in a common guide groove (49) in a guide plate (37), and are positioned relative to one another by a comm in (26).

14. Device as claimed in claim 12, wherein the centering jaws ($5_z$) and/or the stripping knives (5) are replaceable and are elastically bendable along their longitudinal dimension, enabling the centering jaws ($5_z$) and/or the stripping knives (5) to be pushed into a common guide groove (49) and locked on a straight pin (26) during replacement.

15. Device as claimed in claim 6, wherein the heating temperature and/or the heating time of the heater (4) and/or the stripping speed of the powered stripping drive (29) are electronically adjustable, and wherein the heater (4) comprises heating jaws.

16. Device as claimed in claim 15, wherein the powered striping drive (29), the electronic system and the heating jaws (4) are battery-operated.

17. Device as claimed in claim 11, wherein an auxiliary stop (14) is positioned to one side of the optical waveguide (45) between the stripping knives (5) and clamping jaws (36), which auxiliary stop pre-centers the radial position of the optical waveguide before the clamping jaws (36) are closed.

18. Device as claimed in claim 1, wherein a limit is provided to stop the closing movement of the stripping knives (5) to prevent soiling before the stripping knives stop.

19. Process for operating a device as claimed in claim 6, wherein at least the knives (5) and/or jaws (4) close or open during the movement of the displacement element (33) between the stop rings (50) and shoulders (44), while the connecting rods (28), a support element (10) for change operations and the clamping head (3) remain stationary.

20. Device for removing at least one layer from a single-conductor or multiconductor optical waveguide (45), having at least one stripping drive (29) having an axis, a clamping device (3) displaceable in the axial direction of the stripping drive, at least one stripping knife (5) that closes and opens about the optical waveguide, and a displacement element (33) connected for movement by the stripping drive (29), which displacement element, in a first phase of its movement by the stripping drive, makes a frictional connection with a first mechanism (21, 22, 25) for closing and opening the stripping knife (5), and in a second phase of its movement by the stripping drive, makes a connection with a second mechanism (27, 44) for the axial displacement of the clamping device (3) relative to the stripping knife (5).

21. Device as claimed in claim 7, wherein the third coupling is in the form of a friction clutch (35, 20).

22. Device as claimed in claim 6, wherein the jaws are heatable jaws.

23. Device as claimed in claim 6, wherein the jaws are provided with an antifriction coating on their heating surface (54) capable of facing the optical waveguide.

24. Device as claimed in claim 6, wherein the jaws are provided with a strongly adhering coating for the clamped stuffing of strongly adhering protective layers on the fiber.

25. Device as claimed in claim 22, wherein the beating jaws (4) are heatable under voltage-control or current-control.

26. Device as claimed in claim 4, wherein the closing movement of the stripping knives (5) is limited.

27. Device as claimed in claim 9, wherein the friction clutch (20, 35) is pressure controlled.

28. Device as claimed in claim 10, wherein the first control link cooperates with a swivel levers (25) for actuating the stripping knife.

29. Device as claimed in claim 10, wherein the second link control is displaceable by a further connecting rod (35) parallel to the axis of the optical waveguide (45).

30. Device as claimed in claim 29, wherein the further connecting rod (35) is driven by the displacement element (33).

31. Device as claimed in claim 30, wherein the displacement element is driven by a friction clutch (30, 35).

32. Device as claimed in claim 11, wherein the clamping mechanism comprises clamping jaws (36) that are spring loaded in their clamping direction.

33. Device as claimed in claim 12, wherein the stripping knives (5) are arranged between the end of the optical waveguide (45) and the centering jaws ($5_z$) and the stripping knives (5) are actuated together with the centering jaws ($5_z$).

34. Device as claimed in claim 13, wherein the guide groove (49) is closable by a cover plate (38).

35. Device as claimed in claim 1, wherein the powered stripping drive (29) comprises an electrical drive.

36. Device as claimed in claim 1, wherein the powered stripping drive (29) comprises an electric motor.

37. Device as claimed in claim 1, wherein the powered stripping drive (29) comprises a single electric motor.

* * * * *